Jan. 20, 1970     M. SCHONBERGER     3,490,174
WINDOW REGULATING MECHANISM
Original Filed June 28, 1961
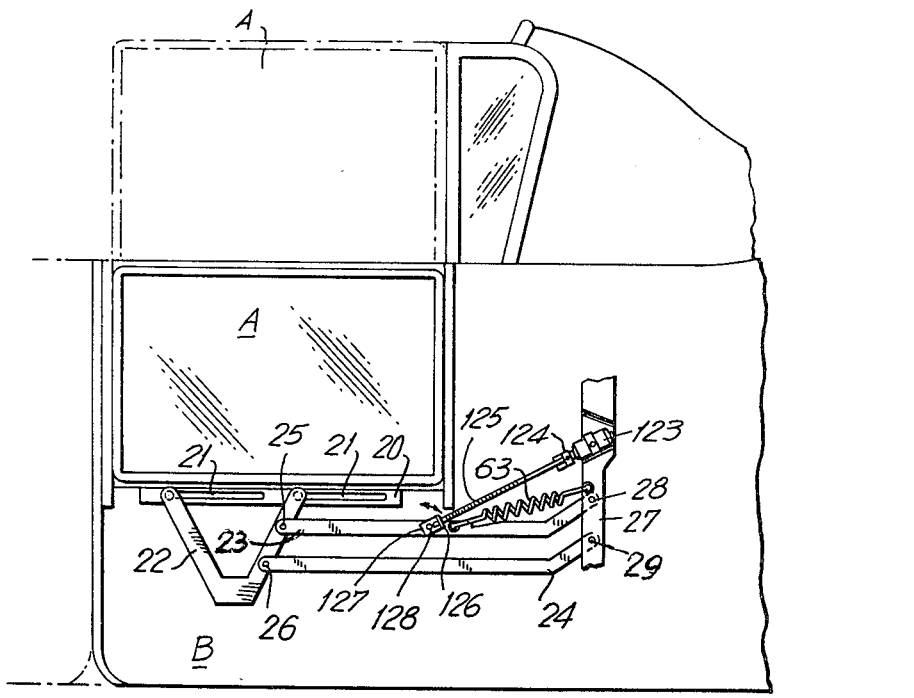
INVENTOR.
MILTON SCHONBERGER
BY
ATTORNEY

United States Patent Office 3,490,174
Patented Jan. 20, 1970

3,490,174
WINDOW REGULATING MECHANISM
Milton Schonberger, Westwood, N.J., assignor to I.N.M. Industries Corporation, New York, N.Y., a corporation of Delaware
Application Mar. 24, 1966, Ser. No. 537,245, now Patent No. 3,389,500, dated June 25, 1968, which is a continuation of abandoned application Ser. No. 133,752, June 28, 1961. Divided and this application June 25, 1968, Ser. No. 739,709
Int. Cl. E05f 15/08, 15/16
U.S. Cl. 49—349    5 Claims

ABSTRACT OF THE DISCLOSURE

Window regulating mechanism, particularly for automobiles, operated by an electric motor forming part of an assembly constructed as a unit supported on a common plate which can be mounted on the inside of a door or of the body of the automobile, the assembly including a bent lever pivoted on the plate, and a counterbalancing spring anchored on the plate adjacent to the pivot of the lever, the other end of the spring being attached to the lever beyond the bend, and a worm driven by the motor and pivotally connected to the lever.

---

This application is a division of my application Ser. No. 537,245, filed Mar. 24, 1966, now Patent No. 3,389,-500 dated June 25, 1968, which in turn is a continuation of my application Ser. No. 133,752 filed June 28, 1961, now abandoned.

The present invention relates to window regulating mechanism, and particularly to motor-operated regulating mechanism for the windows of automobiles.

It is the general object of the invention to provide a regulating mechanism for windows which is simple in construction, inexpensive to manufacture, and convenient and reliable in operation.

It is a further object of the invention to provide a window regulating mechanism which, except for the electric motor, consists substantially wholly of stamped metal parts, and thus can be easily and cheaply made on a large scale.

More particularly, it is an object of the invention to provide a mechanism of the type indicated which can be assembled as a unit, for example, outside of the automobile and installed on the door or body of the automobile with a minimum of labor and adjustment.

An additional object is to provide a regulating mechanism which is adapted for use with both windows which move more or less vertically, as in the case with the front and rear windows of sedans, and windows which are pivoted and are thus rotated to open or closed position, as in the gear windows of convertibles and hardtops.

Further objects of the invention are to provide a window regulating mechanism whose operating parts are characterized by a single lever or a pair of parallel levers, acting directly on the bottom of the window frame or on a slotted member connected thereto, and actuated to raise or lower the window by a simple operating arm connected to the single lever or to one of the two parallel levers, to provide a pre-tensioned counterbalancing spring which is so anchored that it balances approximately the whole weight of the window substantially throughout its range of movement; and to provide a lever mechanism connected with the window which can readily be adapted for operation by an electric motor, all of the said parts, namely, the single and double levers, and the counterbalancing spring and operating arm, being directly mounted or anchored on a small main supporting plate on which they can be assembled as a unit and then installed in assembled condition within the door or body of an automobile or other vehicle, or within a hollow wall beneath the window of a building, or the like.

As the invention is of particular utility in connection with the adjustment of the windows of vehicles, it will be further described as employed for the regulating of the front and rear windows of automobiles.

In accordance with the invention, the motive power for the above-described assembly is provided by an electric motor controlled by a suitable switch.

The invention is characterized by the feature that the operating parts, including the counterbalancing spring, can be assembled as a unit on a small supporting plate and the assembly easily mounted on the inside door panel. The tension in the spring can thus be pre-set for any particular weight or type of window at the factory where the regulating mechanisms are manufactured, and then be mounted on the inside door panel at the assembly plant without further adjustment.

The above and other objects and advantages of the invention will become apparent from the following more detailed description thereof taken together with the accompanying drawings wherein there is illustrated a suitable arrangement for push-button operation of the window regulating mechanism by an electric motor.

Referring to the drawing, there is shown attached to the bottom of the glass window A which slides up and down in known manner in a pair of channels framing the window opening, a bar 20 which is riveted or otherwise secured to the movable bottom frame of the window or forms an integral extension thereof. Horizontal slots 21 loosely receive pins, rivets or rollers extending laterally from the upper ends of a V-shaped support 22 which can accordingly move horizontally in both directions relative to the window frame while simultaneously moving in a vertical direction.

The V-shaped support 22 is actuated to raise and lower the window by two parallel levers 23, 23 pivoted thereto at 25, 26, respectively. The levers are straight throughout most of their length, but are bent upwardly at their right ends to a main bearing plate 27 at 28, 29. The plate may have protruding from it metal tabs (not shown) by which it and the whole assembly may be secured to the inside face of the panel covering the car door or body below the window opening.

In order to reduce the resistance to upward movement of the window, its weight is in large part counterbalanced for easier operation by means of a pre-tensioned coil spring 63 anchored at one end on plate 27 adjacent to pivot 28 of lever 23 and connected at its other end to the lever at a point beyond the bend in the lever. As the window is raised, the spring aids the upward movement. The spring can, however, be anchored at any other point on the fixed plate 27, and its other end can be secured to a point on the support 22 or on the lever 24, due regard being had to the degree of tension in the spring so as to counterbalance substantially completely the weight of the window. Both because of friction and the counterbalancing effect of the spring, the window will stay in any desired position of adjustment, from fully open to fully closed.

The tension in the spring may amount to as much as 180 lbs., although this is not critical. The tension on the spring will depend in large part upon the weight of the glass window and its direction of movement. The pre-tensioning of the spring and the location of its fixed anchor point close to the pivot of the lever insures that there will not be too great a difference in the pull of the spring, so that the effort required to move the window at its lowermost position will be approximately the same as that required to move it from its upper positions. The effect is therefore that of imparting a free-floating condition to the window and substantially only the friction of the parts needs to be overcome to raise or lower it. In a number of highly satisfactory constructions of the regulating mechanism made by me, the spring was 7 to 7½ inches long in its most contracted condition (when the window was in its uppermost position), and in its fully extended condition, that is, when the window was in its lowermost condition, the spring was only about ⅜ to ½ inch longer.

I prefer to employ a spring of such strength that when the window is in its uppermost position, it is completely counterbalanced, so that very little effort is required to lower the window in view of the fact that gravity aids such lowering. When the window is in its lowermost position, it may be slightly overcompensated, so far as its own weight is concerned, but there will still be a small amount of friction to be overcome when the window is raised. This is in contrast to known arrangements in which it is much more difficult to lower the window than to raise it, because with each lowering, effort must be expended to tension the spring to counterbalance the weight of the window.

The levers are actuated by a motor 123 controlled by a switch of any suitable type within reach of the driver or passenger and mounted on the plate 27 above the fulcra 28 and 29. The motor shaft is connected by way of a universal joint 124 with a worm shaft 125 which is received within a threaded opening in the leg 126 of an angular bracket 127 which is pivotally mounted on the lever 23 as by a rivet, pin, or screw 128. As will be readily understood, the pivotal mounting of the bracket 127 and the universal joint 124 allow for changes in the angular relationship between the lever 23 and the shaft 125.

As will be readily understood, the worm shaft 125 and threaded bracket 127 provide a secure lock for holding the window in adjusted position and preventing forced manual opening or closing of the window.

As will be apparent from the drawing, the common mounting of the levers 23, 24, spring 63, and motor 123 on plate 27 (all to one side of and below the window opening) makes it possible to assemble the several parts, including connecting the spring 63 to a lever and shaft 125 within bracket 127, and both levers to support 22, remotely from the vehicle and mount the assembly as a unit on the door or vehicle body.

I claim:
1. Window regulating mechanism comprising a supporting plate, a lever pivoted at one end on said plate and at the other end connected to a window supporting member, a counterbalancing spring anchored at one end on the plate adjacent to the pivot of the lever and connected at its other end to the lever, a threaded member on the lever, a threaded shaft engaging in said threaded member for causing rotation of the lever about its pivot in opposite directions on rotation of the shaft, an electric motor mounted on the plate, and a driving connection between the motor and shaft.

2. Mechanism according to claim 1, wherein the lever forms part of a parallelogram support for the window supporting member.

3. Mechanism according to claim 1, wherein the lever has a downward bend intermediate its ends, the spring being connected to the lever beyond such bend so as to form a chord across the bend.

4. Mechanism according to claim 1, wherein the plate, lever, spring, motor, and shaft are capable of assembly as a unit remote from the window of an automobile, and mountable as a unit on the automobile, said plate being mounted to one side of the window opening, whereby increased leverage for moving the window as obtained.

5. Mechanism according to claim 1, wherein the plate is mounted to one side of the window opening, whereby increased leverage for moving the window is obtained.

References Cited

UNITED STATES PATENTS

| 1,622,603 | 3/1927 | Nicholson | 49—350 |
| 1,696,921 | 1/1929 | Nicholson | 49—350 X |

FOREIGN PATENTS

| 544,458 | 4/1942 | Great Britain. |

J. KARL BELL, Primary Examiner

U.S. Cl. X.R.
49—351